United States Patent [19]
Hargreaves et al.

[11] Patent Number: 4,584,208
[45] Date of Patent: Apr. 22, 1986

[54] PROCESS FOR COATING GLASS

[75] Inventors: Edward Hargreaves, Prescot; Joseph E. Lewis, Ormskirk, both of England

[73] Assignee: Pilkington Brothers P.L.C., St. Helens, England

[21] Appl. No.: 716,167

[22] Filed: Mar. 26, 1985

[30] Foreign Application Priority Data

Mar. 29, 1984 [GB] United Kingdom ............... 8408116

[51] Int. Cl.$^4$ .............................................. C03C 17/22
[52] U.S. Cl. ................................... 427/160; 65/60.51; 427/110; 427/168
[58] Field of Search ...................... 427/110, 160, 168; 65/60.51

[56] References Cited

U.S. PATENT DOCUMENTS 4,172,159 10/1979 Marcault ...................... 427/110 X Primary Examiner—James R. Hoffman
Attorney, Agent, or Firm—Burns, Doane, Swecker & Mathis

[57] ABSTRACT

Solid tin (IV) compounds, free from carbon-tin bonds, and containing both chlorine and fluorine are used to apply infra red reflecting fluorine containing tin oxide coatings to glass. Examples of the tin compounds that may be used are ammonium hexahalostannates of the formula $(NH_4)_2SnHal_6$ wherein Hal represents halogen, and a minor atomic proportion of the halogen present is fluorine and the balance is chlorine. The tin compounds are dispersed in finely divided form in a carrier gas, and the suspension of the tin compound in the carrier gas is directed on to a hot glass surface to be coated.

17 Claims, No Drawings

PROCESS FOR COATING GLASS

BACKGROUND OF THE INVENTION

1. Field of the Invention

The invention relates to a process for the production of infra red reflecting fluorine-containing tin oxide coatings on glass.

2. Description of the Prior Art

It is known that fluorine-containing tin oxide coatings on flat glass of appropriate thickness, for example 100 nm to 1000 nm, reflect infra red radiation whilst transmitting light in the visible part of the spectrum. It is also known to make such coatings by spraying an aqueous solution of tin chloride containing fluorine in the form of hydrofluoric acid or an ammonium fluoride on to hot glass. More recently, it has been proposed, in UK Pat. No. 1,565,765, to overcome some of the practical problems encountered in operating a solution spray process by projecting an organic tin compound in the form of a finely divided powder suspended in a stream of carrier gas containing hydrogen fluoride onto the hot glass. A modified form of this process, which simplifies the problem of controlling the tin:fluorine ratio in the coating produced, is described in European patent application No. 39,256 A1; in this process, a powdered fluorine compound, dispersed in the carrier gas used for the organic tin compound, is used as a source of fluorine in place of the hydrogen fluoride gas. In a preferred form of the invention described in European patent application No. 39,256 A1 a single organic compound such as dibutyl tin difluoride is used as a source of both tin and fluorine.

The coatings produced in accordance with the teaching of European patent application No. 39,256 A1 have high infra red reflectivity and are generally colourless in appearance although, in common with other thin films, they give rise to interference colours in reflection. The interference colours depend on the thickness of the coating, so that variations in thickness across a coating lead to an observable variation in the interference colour seen. The visual impact of the interference colour, and the variations in such colour resulting from variations in thickness of the coating, are generally less the greater the mean coating thickness of the coating. However, it will be appreciated that, since the coatings absorb visible light, the light transmission of the coated glass is reduced as the thickness of the coating is increased.

SUMMARY OF THE INVENTION

It has now been found that fluorine-containing tin oxide coatings of high infra red reflectivity, and increased light transmission for a given thickness of coating deposited at the same temperature, may be produced by using, in place of the powdered organic tin compounds disclosed in the patent specification referred to above, certain inorganic tin compounds in powder form.

According to the present invention, there is provided a process for applying an infra red reflecting fluorine containing tin oxide coating to glass comprising directing on to a hot glass surface at a temperature of 400° to 750° C. a suspension in a carrier gas of a finely divided solid volatile inorganic tin (IV) compound (as herein defined) which contains both chlorine and fluorine.

By the expression "inorganic tin compound" is meant a compound free from carbon-tin bonds. The compounds used in the practice of the invention may, however, contain organic groups not directly bonded through a carbon atom to the tin. The chlorine and fluorine are generally bonded directly to the tin.

It has been found that, in order to obtain a uniform coating, the tin compound should evolve a tin containing vapour at or below the glass temperature. The expression "volatile" is used herein to refer to tin compounds that evolve a tin containing vapour at or below the glass temperature. Compounds which evolve a tin containing vapour at or below 400° C. are preferred, and the best results have been obtained with compounds which are substantially completely volatilised on heating in air at 400° C.

DETAILED DESCRIPTION OF THE INVENTION

The preferred compounds for use in the practice of the present invention are hexahalostannates of formula $Y_2(SnHal_6)_n$
wherein
Y is a cation which does not leave a solid residue when the hexahalostannate decomposes on the hot glass,
n is the valency of the cation,
and Hal represents halogen, the hexahalostannate containing both chlorine and fluorine.

Preferably, a minor atomic proportion of the halogen present is fluorine, and the balance is chlorine.

Y is preferably an ammonium ion, which may be substituted or unsubstituted. The ammonium ion may be substituted with one or more organic groups, for example, alkyl or aryl groups. The chain length of the organic groups is not critical, although it is generally convenient to use organic groups containing up to eight carbon atoms.

A particularly preferred class of compounds for use in the practice of the invention are ammonium hexahalostannates of the general formula:

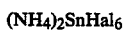

$$(NH_4)_2SnHal_6$$

wherein a minor atomic proportion of the halogen present is fluorine and the balance is chlorine.

In solid form, they may additionally contain water of crystallisation. The ammonium hexahalostannate compositions used in the invention may be a mixture of compounds e.g. a mixture of crystals of ammonium hexachlorostannate and ammonium pentachloromonofluorostannate, or have a substantially homogeneous structure in which the different halogens are distributed throughout a continuous hexahalostannate crystal lattice, the total fluorine content of the composition being a minor atomic proportion of the total halogen present.

Preferably any solid hexahalostannate composition used in the practice of the invention contains an average of 0.1 to 2, preferably 0.5 to 1.5 fluorine atoms, to each tin atom. The balance of the halogen is preferably chlorine although other halogens, especially bromine and iodine, may be present if desired.

The hexahalostannate starting materials referred to above may be prepared by forming an aqueous solution from sources of the cation Y (preferably an ammonium ion, which may be substituted or unsubstituted), tin (IV) ions, fluoride ions and other halide ions in appropriate proportions and evaporating, under vacuum, to dryness. Preferably, stannic chloride is used as a source of tin (IV) ions and chloride ions, and ammonium halides, especially ammonium chloride and ammonium fluoride, are used as sources of ammonium and halide ions.

According to a further aspect of the present invention there is provided a process for forming an infra red reflecting coating on glass comprising mixing in aqueous solution sources of substituted or unsubstituted ammonium ions, tin (IV) ions, fluoride ions and chloride ions in proportions to form an ammonium hexahalostannate in which a minor proportion of the halogen present is fluorine, depositing a solid from the solution and recovering the said solid, grinding the solid to a finely divided powder, suspending the fine powder obtained in a stream of carrier gas and directing the carrier gas containing the fine powder on to a hot glass surface at a temperature in the range 400° C. to 750° C.

Other volatile inorganic tin (IV) compounds (as herein defined) which may be used in the practice of the present invention are adducts of the formula $L_2SnHal_4$ where Hal represents halogen, a minor proportion of the halogen present being fluorine and the balance chlorine, and L is a monodentate ligand, for example dimethyl sulphoxide.

The process of the present invention may be used to coat flat glass hot from the forming process, and is especially useful for coating float glass where it passes out of the float bath into the annealing lehr. At this position, the temperature of the glass will usually be in the range 550° C. to 650° C.

The carrier gas used may conveniently be air, but the oxygen required to form the tin oxide is preferably provided by water. This may be present either in the tin compound as water of crystallisation or absorbed water, or may be added to the carrier gas as water vapour.

It is believed that the uniformity of the coating obtained in the coating process depends, in part, on the particle size of the finely divided tin compound. It is preferred, therefore, to use the inorganic tin compounds in finely divided form with a maximum particle size below 100 microns and preferably below 20 microns. It will generally be necessary to grind the inorganic tin compound prepared as described above in order to obtain the desired fine powder.

The amount of tin compound used will depend on the proportion of tin in the compound, the thickness of coating required, which will depend in turn on the infra red reflection, interference colour and transmission properties required in the product, and on the temperature of the glass. Typically, using the preferred unsubstituted ammonium hexahalostannates in which a minor atomic proportion of the halogen present is fluorine and the balance chlorine, an amount of around 30 grams/square meter in the presence of added water vapour will be sufficient to provide a coating 200 nm thick on hot glass at 650° C., whilst 160 grams/square meter in the presence of added water vapour will be sufficient to provide a coating 1000 nm thick on hot glass at 650° C.

The fluorine doped tin oxide coatings produced by the present invention have, in comparison with fluorine doped tin oxide coatings of the same thickness produced under the same conditions using the organic powder coating reactants proposed in the prior art, higher light transmission. In addition, many of the compounds used in the present invention, e.g. the ammonium hexahalostannates, are generally non-hygroscopic. It is preferred to use non-hygroscopic compounds since they have the advantage of being more readily milled, handled and conveyed than more hygroscopic compounds referred to in the art.

The invention also includes glass having an infra red reflecting fluorine-containing tin oxide coating produced by a process in accordance with the invention.

The invention is illustrated but not limited by the following Examples. In the examples, the values quoted for light transmission are for transmission of light from a C.I.E. Illuminant C Source. The values of emissivity quoted are those obtained by applying the formula $$\text{Emissivity}, E = \frac{\int_0^\infty e_\lambda B(\lambda, T) d\lambda}{\int_0^\infty B(\lambda, T) d\lambda}$$

where
$e_\lambda$ = spectral emittance
and $B(\lambda, T)$ = black body spectral energy distribution at 300° K.

The emissivity, E, calculated as above, is related to the infra red reflectivity of the coating such that, in general, the lower the emissivity the higher the infra red reflectivity.

EXAMPLE 1

50 grams of commerically available $SnCl_4.5H_2O$, 7.6 grams of $NH_4Cl$ and 5.3 grams $NH_4F$ were dissolved with stirring in 100 ml distilled water. The solution was placed in a dessicator over silica gel and the dessicator evacuated and maintained under vacuum until a dry white crystalline powder was obtained. A sample of the powder was ground and examined by X-ray powder photography. The resulting powder photograph showed no observable differences from a powder photograph of a known sample of ammonium hexachlorostannate, indicating that the powder product was an ammonium hexahalostannate. An analysis of the powder showed it to contain 50.1% by weight chlorine and 4.5% by weight fluorine, indicating an ammonium hexahalostannate of formula $(NH_4)_2SnCl_{5.1}F_{0.9}.0.5H_2O$.

A portion of the white solid was mixed with 2% by weight of "Cab-o-Sil" (an amorphous silica available in commerce from Cabot Carbon Limited of Ellesmere Port, England) as a milling additive and flow promoter, and the composition milled in a centrifugal mill to a maximum particle size of less than 100 microns. A sample of the milled solid was suspended in a stream of hot air containing steam as carrier gas and the carrier gas stream projected on to the surface of 6 mm float glass at 650° C. at a rate of 3 gram per 100 square centimeter of glass. The coated glass produced was found to have a light transmission of 77%; the coating was 500 nm thick. The emissivity of the coated glass was found to be 0.23, indicating a high infra red reflectivity.

EXAMPLES 2-12

A series of volatile inorganic tin compounds containing chlorine and fluorine were prepared, and used to coat hot 6 mm float glass using the procedure described in Example 1 but at the glass temperatures and in the amounts specified in Table I. Details of the results obtained are set out in the Table. The preparation of the compounds used is described below, the fluorine to chlorine ratios quoted being atomic ratios:

EXAMPLE 2

(NH₄)₂Sn(Cl,F)₆

1 Kg of SnCl₄.5H₂O was melted at 60° C. and to this was slowly added whilst stirring a mixture of 157 gms of NH₄Cl and 111 gms of NH₄F in powder form. The suspended solid so produced was separated by filtration, washed in isopropyl alcohol, refiltered and dried at 70° C. The product was a white, non-hygroscopic powder. Analysis showed a fluorine to chlorine ratio of 0.54:5.46.

EXAMPLE 3

(NH₄)₂Sn(Cl,F)₆

To a stirred solution of 1 kg of SnCl₄.5H₂O in 200 mls of H₂O were slowly added 215 gms of NH₄F. The suspension, after filtration and drying at 70° C., gave a white non-hygroscopic powder product. Analysis showed a fluorine to chlorine ratio of 1.96:4.04.

EXAMPLE 4

(CH₃NH₃)₂Sn(Cl,F)₆

500 gms of SnCl₄.5H₂O were dissolved in 52 mls of 40% HF and to this stirred solution were slowly added 199 gms CH₃NH₂.HCl. The resulting viscous suspension was allowed to dry under ambient conditions. The ratio of fluorine to chlorine in the final white, non-hygroscopic powder was found to be 0.46:5.54.

EXAMPLE 5

[(CH₃)₄N]₂Sn(Cl,F)₆

40 gms of (CH₃)₄NCl were dissolved in 14 mls of 58% HF and 14 mls of H₂O. This was then added to a stirred solution of 60 gms of SnCl₄.5H₂O in 10 mls of H₂O. The resulting precipitate was separated by filtration and allowed to dry under ambient conditions. The product was a white, non-hygroscopic powder having a fluorine to chlorine ratio of 0.88:5.12.

EXAMPLE 6

[CH₃(CH₂)₃NH₃]₂Sn(Cl,F)₆

41.8 gms of CH₃(CH₂)₃NH₂ were added dropwise to a mixture of 14.4 mls of 40% HF and 28.9 mls of HCl in 40 mls of water. The resulting solution was added slowly to a stirred solution of 100 gms of SnCl₄.5H₂O in 20 mls of H₂O. The precipitate so produced was filtered and dried. The resulting white solid was non-hygroscopic and had a fluorine to chlorine ratio of 0.25:5.75.

EXAMPLE 7

(C₆H₅NH₃)₂Sn(Cl,F)₆

63.5 gms of C₆H₅NH₂.HCl were dissolved in 90 mls of H₂O. This solution was added to 85 gms of SnCl₄.5H₂O dissolved in 15 mls of 40% HF. The resulting precipitate was separated by filtration, was washed twice in isopropyl alcohol and was allowed to dry under ambient conditions. The product was a white, non-hygroscopic powder with a fluorine to chlorine ratio of 1.32:4.68.

EXAMPLE 8

[CH₃(CH₂)₇NH₃]₂Sn(Cl,F)₆

55.3 gms of CH₃(CH₂)₇NH₂ were dissolved in 30 mls of H₂O, and 22 mls of 36% HCl and 12 mls of 40% HF added. The resulting amine salt solution was added with stirring to a solution of 75 gms SnCl₄.5H₂O dissolved in 15 mls H₂O. The resulting stiff paste was filtered to yield a white powder product which was dried in air. It was found to have a fluorine to chlorine ratio of 1.19:4.81.

EXAMPLE 9

(C₅H₅NH)₂Sn(Cl,F)₆

To a solution of 45.2 gms of pyridine in 40 mls of H₂O were slowly added 24.5 mls of 36% HCl followed by 13 mls of 40% HF. A further 3 mls of HCl were added to neutralise the solution. This was then added to a stirred solution of 100 gms of SnCl₄.5H₂O in 20 mls of H₂O. A precipitate was formed which was separated by filtration and allowed to dry under ambient conditions. The resulting non-hygroscopic powder had a fluorine to chlorine ratio of 0.30:5 70.

EXAMPLE 10

Sn(Cl,F)₄.2(CH₃)₂SO

A solution of 32.5 mls of dimethyl sulphoxide in 30 mls of H₂O was added to 70 gms of SnCl₄.5H₂O in 18 mls of 40% HF. The resulting suspension was allowed to go to dryness, giving a white non-hygroscopic powder having a fluorine to chlorine ratio of 0.29:3.71.

The final Example in Table I shows the results obtained using dibutyl tin difluoride (DBTDF) as the source of tin and fluorine.

It will be noted that the results for emissivity vary from 0.22 to 0.37, with the value obtained using DBTDF near the middle of the range. However, the coatings obtained using inorganic tin compounds containing chlorine and fluorine all have higher light transmission than obtained with DBTDF. Of the inorganic tin compounds, the phenyl substituted ammonium hexahalostannate gives the coating with the lowest light transmission, but the light transmission of this coating is still significantly higher than the light transmission of the coating obtained with DBTDF.

TABLE I

| Example | Compound | Glass temperature °C. | Quantity g/100 sq. cm. | Coating thickness nm | E | Light transmission % |
|---|---|---|---|---|---|---|
| 2 | (NH₄)₂Sn(Cl,F)₆ | 620 | 3 | 600 | 0.36 | 75.4 |
| 3 | (NH₄)₂Sn(Cl,F)₆ | 620 | 4.5 | 750 | 0.24 | 78.2 |
| 4 | (CH₃NH₃)₂Sn(Cl,F)₆ | 620 | 3 | 450 | 0.28 | 77.0 |
|  | " | 670 | 3 | 600 | 0.26 | 76.2 |
| 5 | [(CH₃)₄N]₂Sn(Cl,F)₆ | 620 |  | 275 | 0.4 | 78.5 |
| 6 | [CH₃(CH₂)₃NH₃]₂Sn(Cl,F)₆ | 620 | 2 | 425 | 0.37 | 76.8 |
| 7 | (C₆H₅NH₃)₂Sn(Cl,F)₆ | 620 | 3 | 750 | 0.22 | 68.0 |
| 8 | [CH₃(CH₂)₇NH₃]₂Sn(Cl,F)₆ | 620 | 5 | 600 | 0.27 | 68.3 |
| 9 | (C₅H₅NH)₂Sn(Cl,F)₆ | 670 | 3 | 700 | 0.24 | 76.0 |
| 10 | Sn(Cl,F)₄.2(CH₃)₂SO | 620 | 5 | 700 | 0.23 | 72.1 |
| comparative | [CH₃(CH₂)₃]₂SnF₂ | 620 | 1 | 750 | 0.29 | 64.1 |

TABLE I-continued

| Example | Compound | Glass temperature °C. | Quantity g/100 sq. cm. | Coating thickness nm | E | Light transmission % |
|---|---|---|---|---|---|---|
| example | | | | | | | powdered sprinkled on glass from sieve.

EXAMPLE 11

This Example describes the application of a coating to moving glass using an ammonium hexahalostannate prepared as described in Example 2.

$(NH_4)_2SnCl_{5.5}F_{0.5}$ was blended with 4% by weight Cab-O-Sil and was milled in an Alpine Kolloplex Laboratory Mill 160 z. The milled powder was dispensed from a slot, 0.5 m long×0.01 m wide, at a rate of 300 gms/min. in a flow of carrier gas at 140° C., comprising 80 m³/hr air and 45 Kgs/hr steam onto flat glass at 600° C. which was traversed past the slot at 5 m/min. The resulting coating was 800 nm thick and the coated glass had an emissivity of 0.25 and light transmission 79%.

We claim:

1. A process for applying an infra red reflecting fluorine containing tin oxide coating to glass comprising directing on to a hot glass surface at a temperature of 400° to 750° C. a suspension in a carrier gas of a finely divided solid inorganic tin (IV) compound free from carbon-tin bonds which contains both chlorine and fluorine and which evolves a tin containing vapor at or below the glass temperature.

2. A process according to claim 1 wherein the tin compound used is a hexahalostannate of formula $Y_2(SnHal_6)_n$ wherein
    Y is a cation which does not leave a solid residue when the hexahalostannate decomposes on the hot glass,
    n is the valency of the cation,
    and Hal represents halogen, the compound containing both chlorine and fluorine.

3. A process according to claim 2 wherein a minor atomic proportion of the halogen present in the tin compound is fluorine, and the balance is chlorine.

4. A process according to claim 3 wherein Y is an ammonium ion.

5. A process according to claim 3 wherein Y is an ammonium ion substituted with one or more organic groups.

6. A process according to claim 2 wherein Y is an ammonium ion.

7. A process according to claim 2 wherein Y is an ammonium ion substituted with one or more organic groups.

8. A process according to claim 1 wherein the tin compound used is an ammonium hexahalostannate of the formula $(NH_4)_2SnHal_6$ wherein Hal represents halogen, and a minor atomic proportion of the halogen present is fluorine and the balance is chlorine.

9. A process according to claim 8 wherein the solid ammonium hexahalostannate used contains an average of 0.1 to 2 fluorine atoms to each tin atom.

10. A process according to claim 1 wherein the inorganic tin (IV) compound used is an adduct of the formula $L_2SnHal_4$ wherein Hal represents halogen, a minor proportion of the halogen present being fluorine and the balance chlorine and L is a monodentate ligand.

11. A process according to claim 1 in which the carrier gas contains water vapour.

12. A process according to claim 1 in which the inorganic tin compound used is in finely divided form with a maximum particle size below 100 microns.

13. A process for forming an infra red reflecting coating on glass comprising mixing in aqueous solution sources of substituted or unsubstituted ammonium ions, tin (IV) ions, fluoride ions and chloride ions in proportions to form an ammonium hexahalostannate in which a minor proportion of the halogen present is fluorine, depositing a solid from the solution and recovering the said solid, and grinding the solid to a finely divided powder, suspending the fine powder obtained in a stream of carrier gas and directing the carrier gas containing the fine powder on to a hot glass surface at a temperature in the range 400° C. to 750° C.

14. A process for applying an infra red reflecting fluorine containing tin oxide coating to glass comprising forming a suspension in a carrier gas of a solid hexahalostannate composition of formula $Y_2SnHal_6$ wherein Y is an ammonium ion and Hal represents halogen, a minor atomic proportion of the halogen present in the hexahalostannate being fluorine and the balance chlorine, and directing said suspension in the carrier gas onto a hot glass surface at a glass temperature of 400° to 750° C.

15. A process according to claim 14 wherein the solid hexahalostannate used contains an average of 0.1 to 2 fluorine atoms to each tin atom.

16. A process according to claim 14 in which the carrier gas contains water vapour.

17. A process for applying an infra red reflecting fluorine containing tin oxide coating to glass comprising forming a suspension in a carrier gas of a solid hexahalostannate composition of formula $Y_2SnHal_6$ wherein Y is an ammonium ion substituted with one or more organic groups and Hal represents halogen, a minor atomic proportion of the halogen present in the hexahalostannate being fluorine and the balance chlorine, and directing said suspension in the carrier gas onto a hot glass surface at a glass temperature of 400° to 750° C.

* * * * *